United States Patent
Argillier et al.

(10) Patent No.: US 6,537,951 B1
(45) Date of Patent: Mar. 25, 2003

(54) FLUID AND METHOD FOR RELEASING TUBULAR ELEMENTS STUCK IN A WELL

(75) Inventors: Jean-François Argillier, Saint Cloud (FR); André Demoulin, Beauvechain (BE); Annie Audibert-Hayet, Croissy sur Seine (FR); Michel Janssen, Wezelbeej-Oppem (BE)

(73) Assignees: Institut Francais du Petrole, Rueil-Malmaison cedex (FR); Fina Research, Seneffe (BE)

( * ) Notice: Subject to any disclaimer, the term of this patent is extended or adjusted under 35 U.S.C. 154(b) by 0 days.

(21) Appl. No.: 09/600,481
(22) PCT Filed: Jan. 8, 1999
(86) PCT No.: PCT/FR99/00082
§ 371 (c)(1),
(2), (4) Date: Sep. 27, 2000
(87) PCT Pub. No.: WO99/36487
PCT Pub. Date: Jul. 22, 1999

(30) Foreign Application Priority Data

Jan. 19, 1998 (FR) ............................................. 98 01118

(51) Int. Cl.$^7$ ............................. C09K 7/00; E21B 31/00
(52) U.S. Cl. ...................... 507/265; 507/267; 507/940; 166/301
(58) Field of Search ................................ 507/138, 265, 507/267, 940; 166/301

(56) References Cited

U.S. PATENT DOCUMENTS

| | | | | | |
|---|---|---|---|---|---|
| 3,047,493 A | * | 7/1962 | Rosenburg | .................. | 507/138 |
| 4,409,108 A | * | 10/1983 | Carney et al. | .............. | 507/265 |
| 4,964,615 A | * | 10/1990 | Mueller | ...................... | 507/265 |
| 5,252,554 A | * | 10/1993 | Mueller | ...................... | 507/138 |
| 5,441,927 A | * | 8/1995 | Mueller et al. | ............. | 507/138 |
| 5,707,940 A | * | 1/1998 | Bush et al. | ................. | 507/265 |

* cited by examiner

*Primary Examiner*—Philip Tucker
(74) *Attorney, Agent, or Firm*—Antonelli, Terry, Stout & Kraus, LLP

(57) ABSTRACT

The present invention relates to a well fluid for releasing tubular elements stuck in the well. The fluid comprises a part A consisting of one or more esters obtained by reaction of a linear or branched monocarboxylic acid (A.1) having between 8 and 24 carbon atoms and a linear or branched polyol (A.2) having between 2 and 20 carbon atoms, a part B consisting of one or more linear or branched monocarboxylic acids having between 8 and 24 carbon atoms, where the carboxylic acid (A.1 and part B) is a mixture of at least 80% carboxylic acids having between 1 and 3 insaturations, and a part C consisting of a different ester or olefins, the quantity of part C is determined in relation to the other components in such a way that the viscosity of the fluid is lower than 40 mPa·s at 40° C. The invention also relates to a method for releasing drillpipes stuck in a well.

15 Claims, No Drawings

FLUID AND METHOD FOR RELEASING TUBULAR ELEMENTS STUCK IN A WELL

FIELD OF THE INVENTION

The present invention relates to a composition intended to be placed in a well drilled in the ground in order to release tubes or drillpipes stuck by a differential pressure effect or mechanically. The present composition is particularly well-suited for water-base drilling fluids.

BACKGROUND OF THE INVENTION

It is well-known in the art of oil drilling, or others, that there is in many cases a risk of sticking of the drill stem during operation or of the casing pipes as they are set in the well. The causes can have a mechanical origin or be due to the differential pressure prevailing between the inside of the well and the pores of the rock. In fact, the density of the drilling fluid that fills the well is generally such that the hydrostatic pressure created is higher than the pressure of the fluids contained in the pores of the rock formation crossed by the wellbore. Most drilling fluids contain low-water-loss additives preventing filtration of the drilling fluid in the permeable formation through creation of a cake (deposition on the walls of a layer of colloidal particles) whose impermeability quality conditions the quantity of fluid filtered. Drillpipes that stop rotating can stick to the walls, against or in the cake. The thicker the cake, the greater the sticking surface and the greater the force required for unsticking since it is equal to the value of the differential pressure in relation to each side of the cake multiplied by the contact or adhesion surface. In order to release the drill stem, it is common practice to inject a certain volume of a fluid referred to as spotting fluid at the level of the sticking zone in the form of a volume of some cubic meters of a slug injected into the pipes and set in the sticking zone by circulation of another fluid, generally the drilling fluid. The nature of the spotting fluid must be suited to the circulating setting method, i.e. its density must be equivalent to that of the fluid already in place, its viscosity must be such that injection and circulation in the well pose no problems, and it must meet the discharge quality standards in force. There are many spotting fluid compositions, notably those based on mineral lubricating products.

Document U.S. Pat. No. 4,964,615 describes a spotting fluid based on fatty acid ester, an oleophilic bentonite and an emulsifying system. This fluid does not have the optimized composition of the present invention.

SUMMARY OF THE INVENTION

The present invention thus relates to a well fluid for releasing tubular elements stuck in the well. This fluid comprises:
- a part A consisting of one or more esters obtained by reaction of a linear or branched monocarboxylic acid (A.1) having between 8 and 24 carbon atoms and a linear or branched polyol (A.2) having between 2 and 20 carbon atoms, the acid: alcohol (A.1:A.2) molar ratio ranging between 1:1 and (n-n/10):1, where n is the number of hydroxyl groups of alcohol A.2,
- a part B consisting of one or more linear or branched monocarboxylic acids having between 8 and 24 carbon atoms, the carboxylic acid A.1 and part B being each separately a mixture of at least 80% carboxylic acids having between 1 and 3 insaturations,
- a part C consisting of one or more esters obtained by reaction of a linear or branched monocarboxylic acid having between 2 and 24 carbon atoms and a linear or branched monoalcohol having between 2 and 24 carbon atoms, or of one or more linear hydrocarbon chains having at least one insaturation comprising between 8 and 24 carbon atoms, or of one or more branched hydrocarbon chains, saturated or having at least one insaturation comprising between 8 and 24 carbon atoms, said part C having a viscosity lower than about 10 mPa·s at 40° C.,
- possibly a part D consisting of a tertiary amine, and the quantity of part C is determined in relation to the other components in such a way that the viscosity of said fluid is lower than 40 mPa·s at 40° C.

Parts A, B and D can respectively range between the following proportions: between 75 and 90% for A, between 5 and 15% for B, at most 10% of part D, in relation to the total weight of mixture A+B+C.

Parts A, B and D can respectively have the following proportions: 85.4%, 9.5% and 5.1%.

Part A can be pentaerythritol monooleate.

The tertiary amine can be triethanolamine.

The proportion of part C can range between about 60 and 80% in relation to the total weight of the composition.

Part C can mainly consist of 2-ethyl-hexyl oleate.

In this case, a first variant according to the invention can consist in adding at most 40%, in relation to the total weight, of isopropylmyristate.

In the case where part A is mainly pentaerythritol monooleate, a second variant can consist in adding at most 40%, in relation to the total weight, of an ester selected from the group made up of polyglycerol polyricinoleate, polyglycerol monooleate, triheptanoate ethoxylated three times, and mixtures thereof.

In a third variant, it is possible to add at most 40%, in relation to the total weight, of polymerized polyols between dimer and tetramer, linear or branched monoalcohols having between 2 and 10 carbon atoms, or mixtures thereof.

In this third variant, the alcohols can be selected from the group made up of polyglycerol, butanol and a mixture thereof.

In the fluid according to the invention, it is possible to add at most 5% viscosifying agents intended for organic media and a determined quantity of weighting agents.

At most 5%, preferably at most 2% of a wetting and/or dispersing agent can be added.

At most 10% water can also be added.

The present invention also relates to a method for releasing a drill stem stuck in a well, wherein a volume of a fluid as defined above is injected into the well.

The various constituents of the composition according to the invention are non-toxic and non-polluting according to the criteria known in the trade. Of course, considering the different regulations in force according to countries, some products used might be considered acceptable by some countries and not by others as regards the environment.

The spotting fluid can be used as it is in the form of a liquid slug possibly comprising a small proportion of water, or mixed with the water-base drilling fluid, possibly with the oil-base fluids or equivalents.

DETAILED DESCRIPTION

Other features and advantages of the present invention will be clear from reading the description of the following examples.

Two types of tests can be used to show that a composition is efficient as a spotting fluid: the test measuring the unsticking torque of a disk applied to a cake formed on a filter, and the test measuring filtration of the composition through a cake. In fact, the latter test can show that the composition does not remain outside the tube/wall contact but that it gets into the cake contained between the tube and the wall.

The various spotting fluids tested are designated by reference numbers L1 to L10.

L1 corresponds to a mixture of about 70% 2-ethyl-hexyl oleate with about 30% of a compound referred to as <<COMP>>.

L2 corresponds to a mixture of 95% L1 with 5% isopropylmyristate.

L3 corresponds to a mixture of 80% L1 with 20% isopropylmyristate.

L4 corresponds to a mixture of 99.5% L2 with 0.5% Anti-Terra-P.

L5 corresponds to a mixture of 99.5% L2 with 0.5% Disperbyk-108.

Additives Anti-Terra-P and Disperbyk-108 are wetting and dispersing agents made and marketed by the BYK-Chemie GmbH company. Additive Anti-Terra-P is a solution of phosphoric acid salts and of long chains of carboxylic acid polyamiine amides.

Additive Disperbyk-108 is a functionalized hydroxy carboxylic acid ester comprising groups having affinities with pigments.

L6 corresponds to a mixture of 80% L1 with 20% polyglycerol polyricinoleate.

L7 corresponds to a mixture of 80% L1 with 20% triheptanoate glycerol ethoxylated three times.

L8 corresponds to a mixture of 80% L1 with 20% polyglycerol.

L9 corresponds to a mixture of 80% L1 with 20% of a mixture of 95% polyglycerol and 5% butanol.

L10 corresponds to a mixture of 60% L1 with 40% of a mixture of 95% polyglycerol and 5% butanol.

The <<COMP>> tested consists of an ester part A, of an acid part B and triethanolamine, respectively in the followings proportions by weight: about 85.4%, 9.5% and 5.1%; part A being pentaerythritol monooleate (RADIASURF 7156 marketed by FINA Chemicals); part B being RADIACID 208 (marketed by FINA Chemicals) containing about 70% oleic acid, 10% linoleic acid, 6% palmitoleic acid, 5% palmitic acid, 4% myristic acid, 3% linolenic acid and 2% stearic acid.

Without departing from the scope of the invention, in the compound referred to as <<COMP>>, part A can consist of one or more esters obtained by reaction of a linear or branched monocarboxylic acid (A.1) having between 8 and 24 carbon atoms and a linear or branched polyol (A.2) having between 2 and 20 carbon atoms, the acid: alcohol (A.1:A.2) molar ratio ranging between 1:1 and (n-n/10):1, where n is the number of hydroxyl groups of alcohol A.2, and part B can consist of one or more linear or branched monocarboxylic acids having between 8 and 24 carbon atoms, the carboxylic acid (A.1 and part B) being a mixture of at least 80% carboxylic acids having between 1 and 3 insaturations.

Parts A. 1 and B can be selected from the group made up of oleic, stearic, linoleic, linolenic, palmitic, palmitoleic, myristic acid and mixtures thereof.

1) Differential-Pressure Sticking Tests

The differential-pressure tester known as <<Differential Sticking Tester—Model 21150>>) manufactured by the Baroid company, a division of the NL Corp. Company (Instruction Manual Part No.211510001EA), has been modified in order to allow, once the cake formed on the filter and the piston in contact with the cake, to replace the mud used to form the cake with another fluid, for example a spotting fluid according to the invention or comparison fluids. It can be reminded that a test cell consists of a cylindrical chamber comprising a paper filter holder, a lower outlet for collecting the filtrate, an upper cover comprising an orifice for pressurization by means of compressed nitrogen and a shaft bearing a disk arranged in line with the paper filter, a torque wrench connected to the shaft, allowing to measure the resistance moment created by the disk in contact with the cake. The contact face of the disk has been slightly modified so as to have a plane face edged with a very flat truncated cone, whose width does not exceed one centimeter.

The operating conditions are as follows: ambient temperature for the fluids, differential filtering pressure 3.5 MPa, pressure of the disk on the cake equivalent to 5 MPa, for 10 minutes.

A characteristic test is thus carried out as follows: The mud is filtered on paper filter for 30 minutes at a pressure of 3.5 MPa, then the piston is plunged into the cake at an equivalent mechanical pressure of 5 MPa, for 10 minutes. The differential pressure is then suppressed, the piston still being applied on the cake under the action of the mechanical force. The mud remaining in the cell is then removed and replaced by the spotting fluid to be tested. The 3.5 MPa differential pressure is again applied and the mechanical force exerted on the piston is suppressed. After 30 minutes, the torque required to unstick the piston from the cake is measured. The results are expressed in lbs.in (pound.inch) according to the units commonly used in the trade (to be multiplied by 0.11298 to convert into newton.meter).

Composition of the base mud used to form the cake:

| fresh water | |
| --- | --- |
| Wyoming bentonite | 30 g/l |
| filtrate reducer (AQUAPAC Reg) | 1 g/l |
| NaCl | 1 g/l |
| addition of barite so as to have a density | d = 1.2 kg/l. |

The results are shown in the table hereafter: the first line correesponds to the torque measured when the cell contains the mud, without replacement by the spotting fluid.

| Spotting fluid | Torque (in. lbs) | Torque (N.m) |
| --- | --- | --- |
| Mud | 150 | 16.95 |
| L1 | 130 | 14.69 |
| L2 | 100 | 11.3 |
| L3 | 100 | 11.3 |
| L4 | 90 | 10.17 |
| L5 | 65 | 7.34 |
| L6 | 80 | 9.04 |
| L7 | 100 | 11.3 |
| L8 | 65 | 7.34 |
| L9 | 30 | 3.39 |
| L10 | * | |

*Piston jump after 29 minutes.

These results show that replacing the mud by the spotting fluid according to the present invention allows to decrease the unsticking torque.

2) Filtration Tests

A cake is formed by filtration of a mud in an API filtering cell on paper filter for 30 minutes at a pressure of 7 bars and at ambient temperature. The mud remaining in the cell is then removed and replaced by either water (or filtrate), or a spotting fluid according to the invention. The pressure is restored and filtration is measured for 30 minutes. The results are expressed by the weight of the fluid recovered after the 30-mn filtration of the water or of the spotting fluid.

| Fluid filtered through the cake | Weight after 30 minutes (g) | Weight after 60 minutes (g) |
|---|---|---|
| Filtrate | 5.2 | 10.4 |
| L1 | 5.5 | 14.7 |
| L3 | 6.8 | 22.2 |
| L4 | 9.9 | 23.9 |
| L5 | 9.1 | 25.8 |

These results show the good performances of systems L4 and L5. Systems L1 and L3 require more time to be efficient.

3) Rheological and Suspending Properties

A spotting fluid whose viscosity is not too high (pumpability and pressure drop problems in the pipes and the well), but allowing to keep the weighting agents suspended, barite for example (settling risk), has to be formulated. In fact, considering the density of the base products, rather below 1 kg/l, the spotting fluid must generally be weighted for the density of the spotting slug to be close to that of the drilling fluid.

Viscosities: the table hereafter gives the viscosity values of the base components and of the mixtures thereof. The viscosities are measured at 40° C. The proportion of the two components of L1 has to be adjusted so that the mixture has a viscosity lower than 40 mPa·s at a temperature of 40° C., and preferably lower than 20 mPa·s.

| 2-ethylhexyl oleate/COMP (%/%) | Viscosities (mPa · s) |
|---|---|
| 100/0 | 6.9 |
| 70/30 | 15 |
| 30/70 | 51 |
| 0/100 | 156 |

A good ratio substantially corresponds to the 70/30 2-ethylhexyl oleate/COMP mixture.

However, if the composition is sufficiently fluid to be displaced by pumping in the well, it must also have a sufficient suspending power in order to prevent or at least to limit settling of the solids, barite or bentonite for example. A certain quantity of viscosifying products can therefore be added.

The system: L1+X % viscosifier+barite such that d=1.5 kg/l is tested.

VA is the apparent viscosity in centipoise (cP), VP is the plastic viscosity in centipoise (cP) and YV is the yield value in lb/100 ft$^2$ (these measurements are in accordance with the API RP 13B-1 standard which gives the correspondences of the SI units in Appendix I).

The tests consist in measuring the rheology of the formulation according to the percentage of viscosifier Truvis added here, and in comparing the decantation of the solids with time.

Truvis is a viscosifying additive for organic media marketed by Dowell (Schlumberger Dowell Drilling Fluids).

Other viscosifying products can be used without departing from the scope of the present invention, for example other organophilic bentonites or oleophilic polymers.

| Viscosifier (%) | Rheology (cP) (cP) (lb/100 ft$^2$) | Decantation in a 200-ml test tube t = 16 hours (ml) | Decantation in a 200-ml test tube t = 1 week (ml) |
|---|---|---|---|
| 1.5 | VA = 41<br>VP = 33<br>YV = 16 | 4 | 26 |
| 1.7 | VA = 54<br>VP = 42<br>YV = 24 | 2 | 12 |
| 2 | VA = 63<br>VP = 46<br>YV = 34 | 2 | 10 |
| 2.5 | VA = 91<br>VP = 58<br>YV = 66 | 2 | 8 |

These results show that a Truvis viscosifier concentration of the order of 1.7% is an optimum value for this system. Below this value, the suspending properties are lower, and above the viscosities are higher, sometimes too high for certain uses.

The formulation according to the invention can accept high barite concentrations. The example hereafter shows that a density of 1.8 kg/l can be obtained. The formulation of the spotting fluid tested corresponds to L1+1.7% Truvis viscosifier.

| Density | Rheology (cP) (cP) (lb/100 ft$^2$) | Decantation in a 200-ml test tube T = 16 hours (ml) | Decantation in a 200-ml test tube t = 48 hours (ml) |
|---|---|---|---|
| 1.5 | VA = 54<br>VP = 42<br>YV = 24 | 2 | 6 |
| 1.8 | VA = 77<br>VP = 63<br>YV = 28 | 2 | 4 |

Even with a density of 1.8 kg/l, the Theological properties remain correct, as well as the suspending properties.

What is claimed is:

1. A well fluid for releasing tubular elements stuck in a well, the well fluid comprising:
    a part A consisting of one or more esters obtained by reaction of a linear or branched monocarboxylic acid (A.1) having between 8 and 24 carbon atoms and a linear or branched polyol (A.2) having between 2 and 20 carbon atoms, the acid: alcohol (A.1:A.2) molar ratio ranging between 1:1 and (n–n/10):1, where n is the number of hydroxyl groups of alcohol A.2,
    a part B consisting of one or more linear or branched monocarboxylic acids having between 8 and 24 carbon atoms, carboxylic acid A.1 and part B being each separately a mixture of at least 80% carboxylic acids having between 1 and 3 unsaturations,
    a part C consisting of one or more esters obtained by reaction of a linear or branched monocarboxylic acid having between 2 and 24 carbon atoms and a linear or branched monoalcohol having between 2 and 24 carbon atoms, or of one or more linear hydrocarbon chains containing at least one unsaturation having between 8 and 24 carbon atoms, or of one or more branched hydrocarbon chains, saturated or containing at least one unsaturation having between 8 and 24 carbon atoms, said part C having a viscosity lower than about 10 mPa·s at 40° C., and possibly a part D consisting of a tertiary amine,
wherein parts A, B and D respectively range between the following proportions: between 75 and 90% for A, between 5 and 15% for B, from 0% to at most 10% for D, in relation to the total weight of mixture A+B+D, and in that the quantity of part C is determined in relation to the other components so that the viscosity of said fluid is lower than 40 mPa·s at 40° C.

2. The well fluid of claim 1, wherein parts A, B and D respectively have the following proportions: 85.4%, 9.5% and 5.1%, in relation to the total weight of mixture A+B+D.

3. The well fluid of claim 1, wherein said part A is pentaerythritol monooleate.

4. The well fluid of claim 1, wherein said tertiary amine is triethanolamine.

5. The well fluid of claim 1, wherein the proportion of part C ranges between about 60 and 80% in relation to the total weight of the composition.

6. The well fluid of claim 1, wherein said part C mainly consists of 2-ethyl-hexyl oleate.

7. The well fluid of claim 6, to which at most 40% isopropylmyristate, in relation to the total weight, is added.

8. The well fluid of claim 5, to which at most 40%, in relation to the total weight, of an ester selected from the group made up of polyglycerol polyricinoleate, polyglycerol monooleate, triheptanoate ethoxylated three times, and mixtures thereof, is added.

9. The well fluid of claim 1, to which at most 40%, in relation to the total weight, of polymerized polyols made up of between two and four monomers, linear or branched monoalcohols having between 2 and 10 carbon atoms, or mixtures thereof, is added.

10. The well fluid of claim 9, wherein said alcohols are selected from the group consisting of polyglycerol, butanol and mixtures thereof.

11. The well fluid of claim 1, to which at most 5% of a viscosifying agent for organic media and a determined quantity of weighting agents are added.

12. The well fluid of claim 1, to which at most 5% of a wetting and/or dispersing agent, is added.

13. The well fluid of claim 1, to which at most 2% of a wetting and/or dispersing agent, is added.

14. The well fluid of claim 1 to which at most 10% water is added.

15. A method for releasing a drill stem stuck in a well, characterized in that a volume of a fluid as defined in claim 1 is injected into said well.

* * * * *